(12) United States Patent
Osswald et al.

(10) Patent No.: US 9,728,994 B2
(45) Date of Patent: Aug. 8, 2017

(54) DEVICE FOR CHARGING AN ACCUMULATOR AND HAVING A STORAGE CHARGE MODE

(75) Inventors: Alexander Osswald, Stuttgart (DE); Rainer Glauning, Leinfelden-Echterdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1980 days.

(21) Appl. No.: 12/667,821

(22) PCT Filed: May 16, 2008

(86) PCT No.: PCT/EP2008/056048
§ 371 (c)(1),
(2), (4) Date: Apr. 8, 2010

(87) PCT Pub. No.: WO2009/007162
PCT Pub. Date: Jan. 15, 2009

(65) Prior Publication Data
US 2010/0237831 A1    Sep. 23, 2010

(30) Foreign Application Priority Data
Jul. 6, 2007   (DE) ................. 10 2007 031 568

(51) Int. Cl.
*H02J 7/00*   (2006.01)
(52) U.S. Cl.
CPC ............. *H02J 7/0075* (2013.01); *Y02B 40/90* (2013.01); *Y02E 70/40* (2013.01)

(58) Field of Classification Search
CPC .......... H02J 7/0075; Y02B 40/90; Y02E 70/40
USPC ....... 320/110, 112, 125, 127, 128, 132, 162, 320/134–136, 140, 149, 150
See application file for complete search history.

(56) References Cited

U.S. PATENT DOCUMENTS

| | | | | |
|---|---|---|---|---|
| 5,252,906 A | * | 10/1993 | Busson ................. | H02J 7/0078 320/132 |
| 5,432,429 A | * | 7/1995 | Armstrong et al. .......... | 320/136 |
| 5,444,378 A | * | 8/1995 | Rogers ........................ | 324/428 |
| 5,554,921 A | * | 9/1996 | Li et al. ....................... | 320/106 |
| 5,694,023 A | * | 12/1997 | Podrazhansky et al. ..... | 320/129 |
| 5,955,869 A | * | 9/1999 | Rathmann .......... | G01R 31/3648 320/132 |
| 6,204,634 B1 | | 3/2001 | Zimmermann et al. | |
| 6,291,973 B1 | | 9/2001 | Lee | |
| 7,528,578 B2 | * | 5/2009 | Tamai et al. ................. | 320/134 |
| 2005/0134222 A1 | * | 6/2005 | Stinson ........................ | 320/128 |
| 2005/0212484 A1 | | 9/2005 | Denning et al. | |
| 2006/0255769 A1 | * | 11/2006 | Liu et al. ..................... | 320/134 |

(Continued)

*Primary Examiner* — Drew A Dunn
*Assistant Examiner* — Harry O'Neill-Becerril
(74) *Attorney, Agent, or Firm* — Norton Rose Fulbright US LLP; Gerard Messina

(57) ABSTRACT

A device for determining the charge state of an accumulator and having a charging current supply unit that can be operated in a plurality of charging modes is provided. When the storage charge mode is activated, the accumulator is charged only up to a predefined, optimized partially charged state. If the charge state determined at the start of the storage charge mode is higher than the predefined partially charged state, then the discharging device discharges the accumulator as far as the predefined partially charged state.

17 Claims, 1 Drawing Sheet

(56) References Cited

U.S. PATENT DOCUMENTS

2007/0024243 A1 2/2007 Liu et al.
2008/0197801 A1* 8/2008 Manor ................. H02J 7/0054
　　　　　　　　　　　　　　　　　　　　　　　　320/103

* cited by examiner

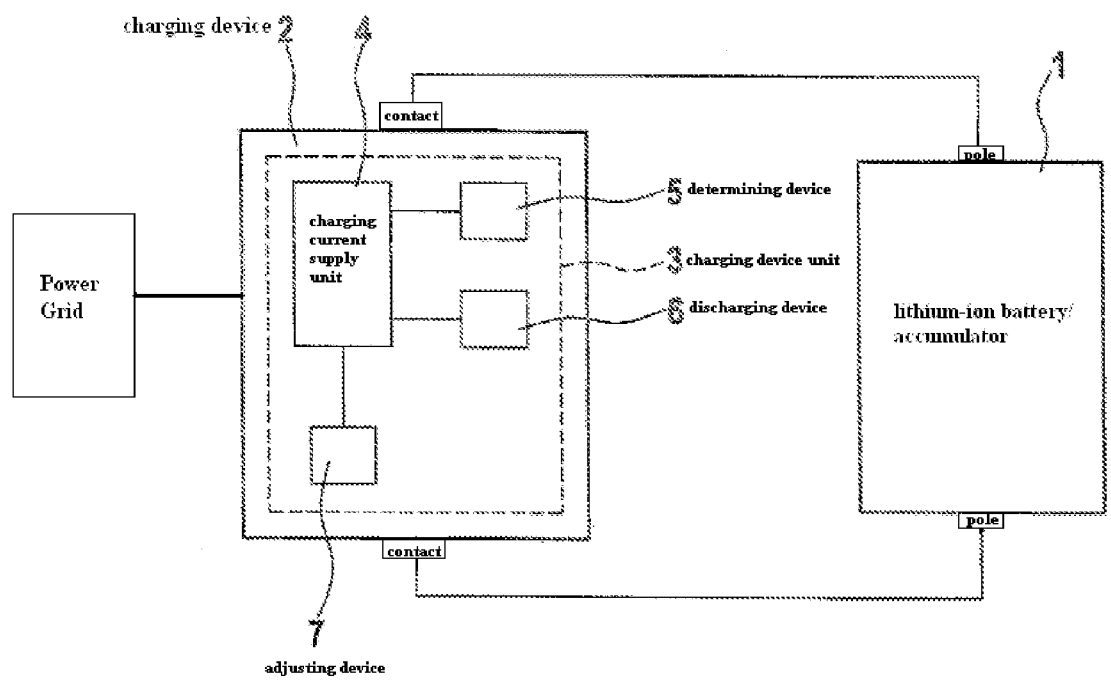

DEVICE FOR CHARGING AN ACCUMULATOR AND HAVING A STORAGE CHARGE MODE

CROSS-REFERENCE TO RELATED APPLICATION

This application is a 35 USC 371 application of PCT/EP 2008/056048 filed on May 16, 2008.

BACKGROUND OF THE INVENTION

Field of the Invention

The invention relates to a device, in particular a charging device, for charging an accumulator, having a charging current supply unit that can be operated in a plurality of charging modes, where a user is able to select the particular charging mode, and having a discharging device provided for at least one of the charging modes.

Description of the Prior Art

A device of this kind is already known from DE 101 07 619 A1. It is a microcontroller-controlled charging device with which the user, before the start of charging, can select from among a plurality of charging functions listed in a menu on a display. For example, in a standard charging mode, the accumulator is first completely discharged and only after this is completely charged. A charging mode can be entirely or partially composed of one or more discharging measures. On the other hand, charging modes without any discharging measures are also provided.

DE 691 23 277 T2 has disclosed a battery charging system in which a charging device that can be operated in at least two different charging modes is connected to a mobile phone that contains an accumulator to be charged and the charging modes can be selected manually via the mobile phone. The mobile phone can be provided with a device for detecting the charge state of the accumulator so that depending on the detected charge state, an associated charging mode is automatically activated. In particular, a charging mode for a slower charging is automatically activated whenever the charge state falls below a threshold value. This automatic selection and activation of a charging mode can be overridden by the manual selection via the mobile phone.

The patent application DE 10 2005 020 356 A1 describes a device, in particular a charging device, having a measuring device for detecting at least one battery parameter that depends in particular on the number of charge/discharge cycles it has undergone and therefore reflects an aging of the battery. In this way, a processing unit can establish an aging-specific charging mode that is assigned to the appropriate, current aging class of the battery. An adjusting device can be provided for manually adjusting the established charging mode, which is individually optimized with regard to the aging of the particular battery, and charging the battery accordingly.

The previous charging modes are operation-oriented. The previous charging modes and charge states—which were unspecific with regard to a subsequent (longer) storage of the accumulator—turn out, however, to be problematic, particularly in connection with lithium accumulators.

In general, it must be assumed that accumulators (rechargeable batteries) can be stored not only in the fully charged or partially charged state, but also after the complete discharging of the energy stored in the cells. Experience shows, however, that lithium-ion cells in particular and rechargeable batteries composed of them, when stored in the (almost) fully charged state, experience a more pronounced aging than is the case when stored in the partially charged or completely discharged state. This aging manifests itself in an increased internal resistance of the battery and an irreversible loss of energy storage capacity of lithium-ion batteries.

First and foremost, storage in the fully charged state accelerates the aging of lithium-ion cells so that after even one month of storage, a significant reduction in the capacity of the accumulator can occur. In order to avoid this effect, newly produced cells are stored and shipped in a partially charged state. If battery packs in use are to be stored for longer periods of time, it has up to now been advantageous to connect a consumer (appliance or external electrical load) to the lithium-ion accumulator in order to change it into a partially charged state.

ADVANTAGES AND SUMMARY OF THE INVENTION

The device according to the invention is provided with a device for determining the charge state of the accumulator and a storage charging mode in which when activated, the accumulator is only charged to a predetermined partial charge state that is optimized with regard to a foreseeable storage of the accumulator; the discharging device discharges the accumulator to the predetermined partial charge state if the charge state determined at the beginning of the storage charging mode is higher than the predetermined partial charge state.

The partial charge state that is optimized with regard to a storage period can therefore be produced either by charging or discharging, depending on the currently detected charge state of the particular accumulator. The partial charge state produced according to the invention is more suitable for the long-term storage of the accumulator than the fully charged state since it is accompanied by a reduced aging even in long-term storage. The invention therefore extends the service life of the accumulator. Its achievement is that accumulators that are used only occasionally are able to reversibly absorb a greater quantity of energy during charging than would be the case after being stored multiple times in the fully charged state. This avoids the otherwise irreversibly occurring capacity loss incurred by storing the battery in the fully charged state. According to the invention, no additional device is required for this discharging for achieving an optimum storage state. It is also not necessary for the device that is normally powered by this accumulator to be switched on solely for the purpose of discharging the accumulator. It is particularly advantageous that a partial charge state that is optimum with regard to storage can be predetermined individually for a particular accumulator cell chemistry. In addition, the user can use the selectable storage charging mode to adapt the charging process to particular use habits.

The invention is therefore particularly advantageous in charging devices for battery packs that are not permanently connected to the device to be powered and for accumulators that are not constantly in use or that are stored for longer periods of time after an occasional use. Service conditions of this kind are typically found in tool rentals, in medical technology, or in the military sector. The storage charging mode can be selected as one of a variety of charging modes.

In a particularly preferable embodiment of the device, the device determines the charge state based on the accumulator voltage. This is particularly possible in lithium-ion accumulators. In other technologies, the device determines the charge state by evaluating information that can be transmitted to the device from charge state electronics that balance the charge state and are integrated into the accumulator.

It is advantageous that aside from the storage charging mode, the charging modes also include a quick charging mode in which the accumulator is charged only to a predetermined partial charge state that is optimized with regard to the charging duration and the level of the achievable charge state. In addition, a gentle charging mode can be provided in which the accumulator is charged to a partial charge state that is a predetermined distance from a charge state in which the accumulator is considered to be fully charged. It is also advantageous to provide an additional supercharging mode in which the accumulator is charged to a predetermined level above the charge state in which the accumulator is considered to be fully charged.

In all of the embodiments of the invention, the charging modes can advantageously be manually selected by means of an adjusting device or by inserting the accumulator into a charging slot provided for the particular charging mode.

In an advantageous modification of the above-mentioned embodiments, the device according to the invention includes a device for detecting a coding that is present on or in the accumulator, a coding being associated with a particular charging mode or with particular charging modes so that it is only possible to select and/or activate these charging modes to charge the accumulator. It is thus actually not possible to activate or even select the other charging modes that for technical reasons, must not be activated with this accumulator provided with the particular coding.

It is particularly preferable to embody the device according to the invention as a separate charging device. The device can, however, also be integrated into the accumulator.

The accumulator-charging system according to the invention includes a device of the above-described type and an accumulator using a technology, in particular the lithium-ion technology, in which the storage of the accumulator in a non-optimal charge state leads to a more pronounced aging of the accumulator, which is avoided by means of the storage charging mode.

BRIEF DESCRIPTION OF THE DRAWINGS

The invention will be described in further detail below in conjunction with the drawing, in which:

The FIGURE is a schematically depicted circuit diagram of an exemplary embodiment for an accumulator charging system according to the invention.

DESCRIPTION OF THE PREFERRED EMBODIMENT

In the following, a "battery" or an "accumulator" is understood to be the electrical connection of one or more rechargeable cells inside a battery housing. The described charging device according to the invention can be used, for example, to charge accumulators that can be used to supply power to electrical power tools.

The sole figure shows an exemplary embodiment of the invention. The two poles of the lithium-ion battery 1 to be recharged, which is equipped with one or more electrochemical cells, are connected to the complementary contacts of the charging device 2 for example by means of a plug connection (not shown). During the charging, the charging device 2 itself is supplied with charging voltage via charging contacts, not shown, usually from the power grid. The charging device 2 can have an accumulator receptacle into which the accumulator 1 is inserted for charging; the charging device can, however, also be provided on the accumulator 1 or integrated into it.

The charging device 2 has a charging device unit 3 that includes a charging current supply unit 4, a discharging device 6, a device 5 for determining the charge state of the accumulator 1, and an adjusting device 7 by means of which it is possible to manually select the different charging modes in which the charging current supply unit 4 can be operated. The adjusting device 7 can, for example, have an actuating element composed of a rotary knob, a switch, buttons, or a keyboard. Alternatively, the charging device 2 has a plurality of insertion possibilities, or charging slots, which are associated with the different charging modes. The charging device 2 can also have additional elements, e.g. display elements, circuit closers, etc.

The function of this exemplary embodiment is described below. The device 6 for determining the charge state and the discharging device 5 are electrically connected to each other via the charging current supply unit 4, which typically includes a microprocessor for controlling the charging device 2.

Normally, the accumulator 1 is charged to a maximum accumulator voltage in order to achieve the desired high capacity in which the accumulator 1 is considered to be fully (100%) charged. In the event of a foreseeable upcoming longer storage interval, however, it is more advantageous if the accumulator 1 is only charged to a certain percentage. An empirically determined ideal storage charge state of for example 30% corresponds, in lithium-ion accumulators, to a certain associated accumulator voltage of the particular accumulator 1, which can be easily detected or determined by means of the device 6. In other accumulator technologies, a set of charge state electronics in the accumulator, which balance the charging/discharging, can be used to determine the charge level.

If the user foresees a storage of the accumulator 1, then the actuating element is used to select the storage charging mode. As soon as the storage charging mode is activated, the remaining sequence of the charging process depends on the current charge state of the accumulator 1 and on the predetermined optimum partial charge state for storage. If at the beginning of the storage charging mode, the accumulator 1 is only partially, for example 10%, charged and if an optimum partial charge state of 30% for storage is predetermined, then the charging current supply unit 4 begins with the charging, which is continued until the accumulator voltage detected by the device 6 assumes the value that corresponds to the 30% charge state. On the other hand, if at the beginning of the storage charging mode, the accumulator 1 still has a charge greater than the predetermined percentage (charge state) for the storage charging mode, then the discharging device 5 discharges the accumulator 1 until it reaches the predetermined percentage (here: 30%).

In addition to a standard charging mode and the storage charging mode, a quick charging mode can be implemented in the charging device 2. When this charging mode is selected, the accumulator 1 is quickly charged to a predetermined percentage, for example 70%. This is advantageous, for example, in lithium-ion accumulators or lead accumulators in which a complete charge can take a very long time due to the drop in charging current as a high charge level is reached. In addition or alternatively, it is conceivable to provide a gentle charging mode in which the accumulator 1—depending on the cell technology—is not completely charged, i.e. is charged to only 90%, for example. Depending on the accumulator technology, other charging modes are also conceivable, for example a supercharging to beyond 100%, in which the outsized capacity is achieved with the disadvantage of a reduced service life.

Incidentally, if a certain accumulator type must only be charged with a particular charging mode or with particular charging modes, then the charging device 2 can detect this by means of a for example mechanically or electronically embodied coding provided on or in the accumulator 1.

The functions of the above-described basic circuit diagram can be incorporated into the known IC arrangements used for monitoring the operation of charging devices.

The foregoing relates to the preferred exemplary embodiment of the invention, it being understood that other variants and embodiments thereof are possible within the spirit and scope of the invention, the latter being defined by the appended claims.

The invention claimed is:

1. A charging device for charging an accumulator having at least one rechargeable battery cell, comprising:
   a charging current supply unit that is operable in a plurality of charging modes, the plurality of charging modes selectable by a user;
   a discharging device provided for at least one of the charging modes; and
   a determining device for determining a charge state of the accumulator, having a storage charging mode,
   wherein when the storage charging mode is activated, the accumulator is only charged to a predetermined partial charge state that is optimized with regard to a foreseeable storage of the accumulator, and
   wherein if the charge state determined by the determining device at a beginning of the storage charging mode is higher than the predetermined partial charge state, the discharging device discharges the accumulator to the predetermined partial charge state.

2. The device as recited in claim 1, wherein the determining device determines the charge state based on the accumulator's voltage.

3. The device as recited in claim 2, wherein the charging modes additionally include a quick charging mode in which the accumulator is only charged to a predetermined partial charge state that is optimized with regard to the charging duration and the level of the achievable charge state.

4. A system for charging an accumulator, equipped with a device as recited in claim 2, in which the accumulator is implemented using a technology, in particular a lithium-ion technology, in which storage of the accumulator in a non-optimal charge state leads to a more pronounced aging of the accumulator.

5. The device as recited in claim 1, wherein the determining device determines the charge state by evaluating information that is transmissible to the device for determining the charge state from charge state electronics that balance the charge state and are integrated into the accumulator.

6. The device as recited in claim 5, wherein the charging modes additionally include a quick charging mode in which the accumulator is only charged to a predetermined partial charge state that is optimized with regard to the charging duration and the level of the achievable charge state.

7. The device as recited in claim 6, wherein the charging modes additionally include a gentle charging mode in which the accumulator is charged to a partial charge state that is a predetermined distance from a charge state in which the accumulator is considered to be fully charged.

8. The device as recited in claim 7, wherein the charging modes are manually selectable by means of an adjusting device or by inserting the accumulator into a charging slot provided for the particular charging mode.

9. The device as recited in claim 8, wherein means are provided for detecting a coding that is present on or in the accumulator and a coding is associated with a particular charging mode or with particular charging modes so that it is only possible to select and/or activate these charging modes to charge the accumulator.

10. A system for charging an accumulator, equipped with a device as recited in claim 5, in which the accumulator is implemented using a technology, in particular a lithium-ion technology, in which storage of the accumulator in a non-optimal charge state leads to a more pronounced aging of the accumulator.

11. The device as recited in claim 1, wherein the charging modes additionally include a quick charging mode in which the accumulator is only charged to a predetermined partial charge state that is optimized with regard to the charging duration and the level of the achievable charge state.

12. The device as recited in claim 1, wherein the charging modes additionally include a gentle charging mode in which the accumulator is charged to a partial charge state that is a predetermined distance from a charge state in which the accumulator is considered to be fully charged.

13. The device as recited in claim 1, wherein the charging modes are manually selectable by means of an adjusting device or by inserting the accumulator into a charging slot provided for the particular charging mode.

14. The device as recited in claim 1, wherein means are provided for detecting a coding that is present on or in the accumulator and a coding is associated with a particular charging mode or with particular charging modes so that it is only possible to select and/or activate these charging modes to charge the accumulator.

15. A system for charging an accumulator, equipped with a device as recited in claim 1, in which the accumulator is implemented using a technology, in particular a lithium-ion technology, in which storage of the accumulator in a non-optimal charge state leads to a more pronounced aging of the accumulator.

16. The device as recited in claim 1, wherein the predetermined partial charge state that is optimized with regard to the foreseeable storage of the accumulator is approximately 30% of a possible charge status.

17. The device as recited in claim 1, wherein the accumulator has only one rechargeable battery cell.

* * * * *